UNITED STATES PATENT OFFICE.

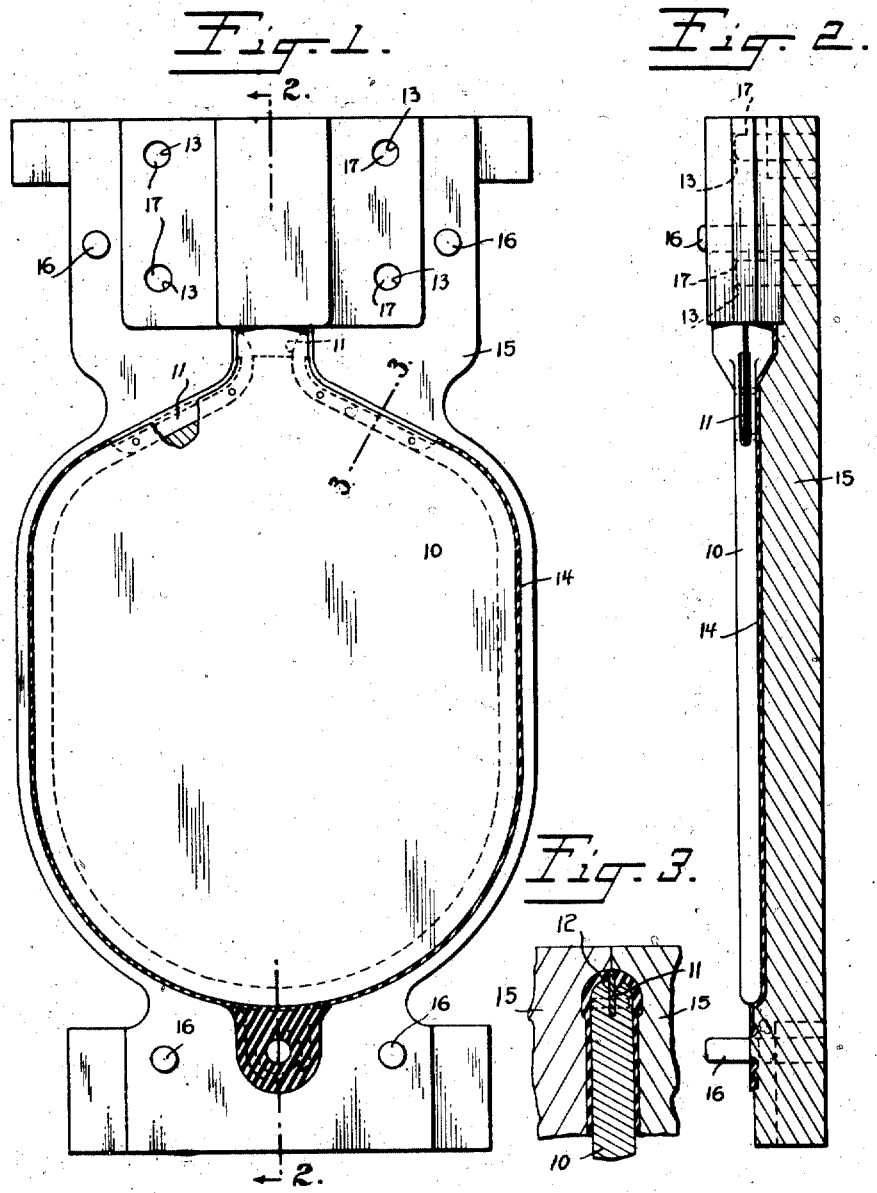

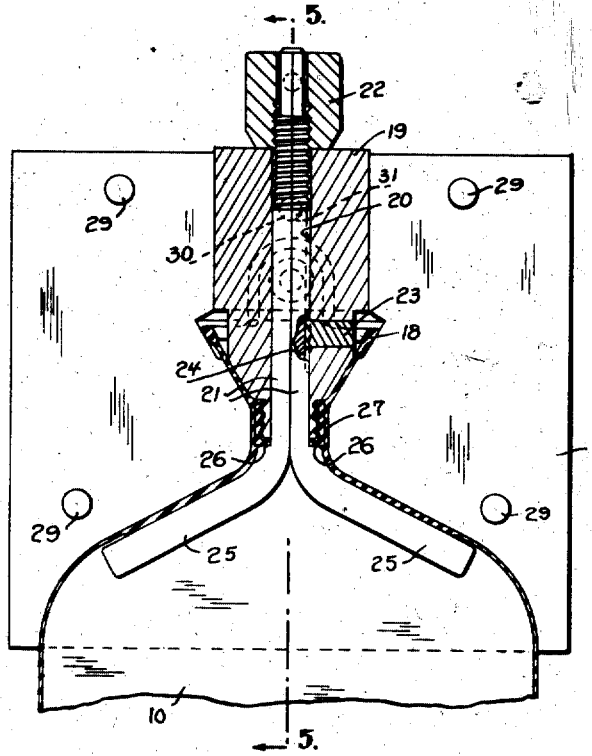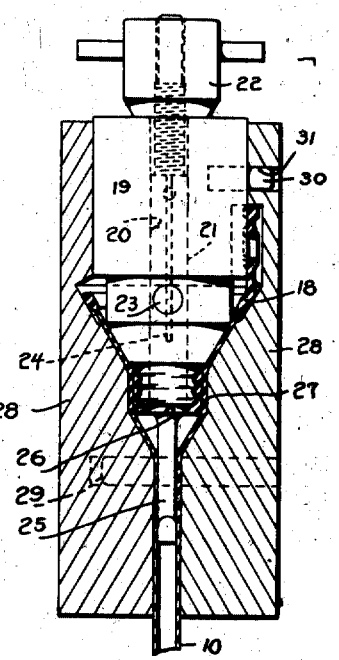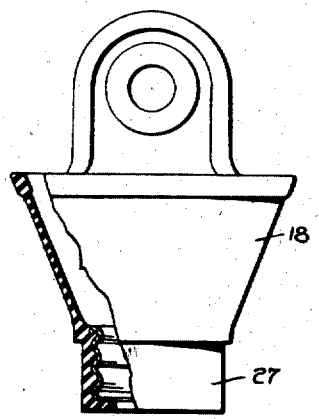

REES BEYNON, OF CHICAGO, ILLINOIS, ASSIGNOR TO THE MECHANICAL RUBBER COMPANY, A CORPORATION OF NEW JERSEY.

METHOD AND APPARATUS FOR MAKING HOLLOW RUBBER ARTICLES.

1,277,179.

Specification of Letters Patent.  Patented Aug. 27, 1918.

Application filed January 10, 1917. Serial No. 141,514.

*To all whom it may concern:*

Be it known that I, REES BEYNON, a citizen of the United States, residing at Chicago, county of Cook, and State of Illinois, have invented certain new and useful Improvements in the Methods and Apparatus for Making Hollow Rubber Articles, of which the following is a full, clear, and exact description.

This invention relates to molded hollow rubber articles, particularly to those with small openings or necks through which the molding core cannot conveniently be removed, such as hot water bottles and the like.

In practising my invention I preferably use apparatus, whereby when the core of the bottle body mold is removed through an opening at the neck portion of the body the edges of said opening may be thereafter vulcanized and the filling-funnel simultaneously vulcanized to the body, in a special mold having a special core, which will be hereinafter more fully set forth.

By the use of my improved method and apparatus a hot water bottle or similar article is produced which is substantially a molded article without joint, and one in which the usual method of cementing the edges is obviated.

The invention can be easily understood from the following description taken in connection with the accompanying drawing in which—

Figure 1 is a plan view of the bottle body mold and core, with the upper section of the mold removed and showing the body of the bottle in cross-section.

Fig. 2 is a longitudinal sectional view on the line 2—2 Fig. 1 with the core in elevation.

Fig. 3 is a fragmentary sectional view on the line 3—3 Fig. 1.

Fig. 4 is a plan view of the final mold and core, with the upper section of the mold removed and showing the assembled parts of the bottle in cross-section.

Fig. 5 is a longitudinal sectional view on the line 5—5 Fig. 4 with the core in elevation.

Fig. 6 is a detail plan view of the filling-funnel with a portion broken away.

Referring to the drawing, 10 designates a core for molding the interior of the body of a hot water bottle. The core is provided with flanges 11 at the neck portion which form an opening 12 in the neck portion of the body through which the core is removed. The neck portion of the core is provided with a core support having dowel openings 13. When the core 10 is covered with a sheet of unvulcanized rubber sufficient to form the body 14 of the bottle, the same is inclosed in mold sections 15 held together by dowel pins 16, and which have suitable recesses therein to give the correct thickness to the walls of the body, and are also provided with dowel pins 17 which enter the openings 13 and correctly locate the core within the mold when the sections are assembled. The above described parts being assembled, the mold with its contents is placed in a vulcanizer and the rubber stock cured in the usual way. The sections 15 of the mold are then removed, and the core 10 removed from the body of the bottle by pulling it through the opening formed at the neck portion of the body by the flanges 11. The rubber is sufficiently elastic to permit this without injuring the edges of the opening.

The filling-funnel 18 of the bottle is formed separately from the body in any preferred manner, preferably by molding, and is vulcanized to the body simultaneously with the sealing of the opening through which the core 10 is withdrawn. To accomplish this the funnel is first supported upon a special core comprising a support 19, having a portion adapted to conform to the interior of the filling-funnel, and provided with a longitudinal opening 20 therethrough, which receives half round rods 21 the upper ends of which project from the support and are exteriorly threaded to receive a nut 22. The rods are prevented from turning in the opening by a pin 23 which projects from the support into a groove 24 in one of the rods. The lower ends of the rods project from the support and are terminally bent outwardly to provide diverging arms 25, the purpose of which will presently be explained, each arm having a stop shoulder 26 which contacts with the filling-funnel as shown in Fig. 4, and limits movement of the arm toward the support when the nut 22 is screwed tight against the support.

After the support 19 and arms 25 are approximately in position, the arms 25 are inserted through the opening of the bottle body, through which the core 10 was withdrawn, and the neck portion 27 of the filling-funnel is fitted into the neck portion of the body. Prior to this, a vulcanizable cement is applied to the outer surface of the neck portion of the funnel, and also to the edges of the opening through which the body forming core was removed, or if preferred a cement may be used which may be vulcanized by sulfur monochlorid when it is desired to unite the parts and seal the opening by the cold cure process. The assembled parts are then placed between the sections of a special mold which consists of sections 28 held together in the correct relative position by dowel pins 29, there being a dowel pin 30 in the funnel core that passes into an opening 31 in one of the mold sections 28 to correctly locate the parts within the mold when the sections are assembled. The nut 22 is then turned a sufficient number of times to cause the arms 25 to be drawn up against the margins of the opening through which the core 10 was withdrawn and press the edges of the opening tightly together, as well as press the united edges tightly against the mold sections during cure. The mold with its contents may be supplied with heat by placing the same between platens of a vulcanizing press, or in any other preferred way. If the cold cure is used, the mold sections may be simply compressed during the curing process. After cure the sections 28 of the mold are removed and the core is then removed piece meal through the filling-funnel by first removing the nut 22, then withdrawing the support 19, and finally withdrawing the presser arms 25 separately through the open neck of the funnel.

Although I have described and illustrated a specific apparatus, and outlined a specific sequence of manipulation of materials in producing the molded rubber article, I do not limit myself to the specific apparatus nor to the specific sequence of manipulation, since various modifications may be resorted to within the scope of the appended claims without departing from the spirit or sacrificing any of the advantages of the invention.

Having thus described my invention, what I claim and desire to protect by Letters Patent is:

1. A molding core for hollow rubber articles, comprising a support having an opening therethrough, rods passing through said opening and terminating beyond the support in diverging arms, and means for adjustably securing said rods in said opening.

2. A molding core for hollow rubber articles, comprising a support having an opening therethrough, rods passing through said opening and having one end threaded, and terminating at the other end in an arm adapted to conform to the neck portion of the article, and a nut on the threaded ends of the rods for moving the rods longitudinally through said opening.

3. The process of manufacturing hollow rubber articles comprising a body and a filling-funnel initially separately formed, which consists in vulcanizing the body separately around a suitable core in a mold, simultaneously forming in the neck portion of the body an opening, removing the core through said opening, and then simultaneously closing said opening and uniting the filling-funnel to the body.

4. The process of manufacturing hollow rubber articles comprising a body and a filling-funnel initially separately formed, which consists in vulcanizing the body separately around a suitable core in a mold, simultaneously forming in the neck portion of the body an opening, removing the core through said opening, and then simultaneously sealing the opening through which the core was withdrawn and uniting the filling-funnel to the body by vulcanization.

5. The process of manufacturing hollow rubber articles comprising a body and a filling-funnel initially separately formed, which consists in vulcanizing the body separately around a suitable core in a mold, simultaneously forming in the neck portion of the body an opening, removing the core through said opening, and then simultaneously vulcanizing the edges of the opening together and vulcanizing the filling-funnel to the body in a second mold.

6. The process of manufacturing hollow rubber articles comprising a body and a filling-funnel, which consists in vulcanizing the body separately around a suitable core in a mold, simultaneously forming in the neck portion of the body an opening, removing the core through said opening, inserting a presser arm through the opening and into engagement with the margins thereof, applying the filling-funnel to the neck portion of the body, and then simultaneously vulcanizing the edges of said opening together and vulcanizing the filling-funnel to the body in a second mold which resists the pressure of said arm.

7. Apparatus for closing a core-removing-opening extending into the neck of a water bottle or the like and for assembling the funnel and body portion together, which comprises an outer mold for exteriorly supporting the body portion and funnel and walls about the opening, a core adapted to engage the said walls on the interior thereof and to extend through the funnel to the exterior, and means coöperating with the exterior portion of the core to draw the core toward the oppositely disposed walls of the mold into operable coöperation therewith.

8. Apparatus for closing a core-removing-opening extending into the neck of a water bottle or the like which comprises an outer mold for supporting the walls about the opening, a core easily removable through the neck of the bottle and having its lower end bent to engage the inner walls about the opening and its opposite end extending from the neck of the bottle, and means engaging the extending end to draw the core toward the oppositely disposed supporting walls of the mold into operable coöperation therewith.

9. Apparatus for closing a core-removing-opening extending into the neck of a water bottle or the like and for assembling the funnel and body portion together, which comprises an outer mold for exteriorly supporting the body portion and funnel and walls about the opening, a core for engaging the funnel interiorly, provided with an opening extending therethrough, a core adapted to engage the said walls on the interior thereof and to extend through the said opening to the exterior, and means coöperating with the extended portion to draw the core toward the oppositely disposed walls of the mold into operable engagement therewith.

10. Apparatus for closing a core-removing-opening extending into the neck of a water bottle or the like and for assembling the funnel and body portion together, which comprises an outer mold for exteriorly supporting the body portion and funnel and walls about the opening, a core for engaging the funnel interiorly, provided with an opening extending therethrough, means for securing the core and mold in fixed relative positions, a closing core adapted to engage the said walls on the interior thereof and to extend through the said opening to the exterior, and means engaging said extended portion and coöperating with said first core to move the said first core and mold relative to the closing core.

11. Apparatus for closing a core-removing opening extending into the neck of a water bottle or the like, which comprises an outer mold for supporting the walls about the opening, a core formed of independent sections adapted to extend through the neck of the bottle and having their lower ends bent to engage the inner walls about the opening and their opposite ends extending from the neck of the bottle, and means for securing the sections together at their outer ends and for drawing them simultaneously toward the oppositely disposed supporting walls of the mold.

Signed at Chicago, Ill., this 2nd day of January, 1917.

REES BEYNON.